United States Patent [19]

Koki

[11] Patent Number: 4,796,031
[45] Date of Patent: Jan. 3, 1989

[54] RADAR SYSTEM
[75] Inventor: Nakatsuka Koki, Kanagawa, Japan
[73] Assignee: Mitsubishi Denki Kabushiki Kaisha, Tokyo, Japan
[21] Appl. No.: 85,101
[22] PCT Filed: Nov. 6, 1986
[86] PCT No.: PCT/JP86/00560
 § 371 Date: Jul. 2, 1987
 § 102(e) Date: Jul. 2, 1987
[87] PCT Pub. No.: WO87/03099
 PCT Pub. Date: May 21, 1987
[30] Foreign Application Priority Data
 Nov. 6, 1985 [JP] Japan .............. 60-248334
[51] Int. Cl.[4] .............................. G01S 13/48
[52] U.S. Cl. ........................... 342/148; 342/149
[58] Field of Search .................. 342/148, 147, 156
[56] References Cited
 U.S. PATENT DOCUMENTS 3,229,283  1/1966  Hefter et al. ............. 342/148 X
 3,618,093  11/1971 Dickey, Jr. .............. 342/148 X
 3,795,913  3/1974  Kosowsky et al. ........ 342/148 X
 4,110,754  8/1978  Endo ....................... 342/147
 4,219,816  8/1980  Schenkel et al. .

FOREIGN PATENT DOCUMENTS 51-144197 12/1976 Japan .
 60-46477   3/1985  Japan ..................... 342/148

OTHER PUBLICATIONS

P. R.: "Accurate Tracking of Low Elevation Targets over the Sea with a Monopulse Radar", Radar Present & Future, (date unknown), pp. 160-165.

Primary Examiner—T. H. Tubbesing
Assistant Examiner—Mark Hellner
Attorney, Agent, or Firm—Lowe, Price, LeBlanc, Becker & Shur

[57] ABSTRACT

Where reflection coefficient k of the surface of the sea is in a relatively wide range and as the ratio of the antenna height to the wavelength is larger, a radar system can eliminate ambiguities in measuring a target height of a low elevation angle on the sea surface. An antenna receives two beams, one beam having slightly different elevation angle from the other. An antenna direction adjusting mechanism adjusts, on the basis of $\tan^{-1}(ha/R)$, a direction in which receiving sensitivity of one of the beams is equal to receiving sensitivity of the other beam, so that this direction aims at mid point between the target and the image of the target. The phase difference between the two beams is obtained with respect to two different frequencies. Two series of data of the target height are obtained each on the basis of the respective phase difference. These series of data are compared on term-to-term basis for two terms nearly equal to each other for extracting one of the two terms as the true height of the target.

2 Claims, 5 Drawing Sheets

RADAR SYSTEM

TECHNICAL FIELD

The present invention relates to a radar system for precisely measuring an angle of elevation of a target with a low elevation angle over a surface of a sea where a strong mirror reflection wave exists.

BACKGROUND ART

Conventionally, for a precise measurement of an angle of a target, (1) a voltage which becomes greater as the target in the radiation beam of a radar antenna shifts from a direction of the beam center to the peripheral section, namely, the angle error voltage has been measured and the magnitude of the measured value has been used.

As methods to generate such a voltage, there have used a monopulse method in which the sum pattern and the difference pattern are generated in the antenna, a conical scan method in which the radiation beam is successively rotated about the direction of the antenna axis, and a lobe switching method in which the radiation beam in the angle measuring plane is successively deflected with the center located at the direction of the antenna axis.

In this specification, we use the term "beam" to refer to a radio wave which, not only when emitted but also when received, has a particularly strong intensity in a specific direction.

Moreover, as other precise measurement methods, there have been (2) a method in which a plurality of antennas are located in the angle measuring plane with the distance therebetween each being slightly different from each other and the reception phase differences between the respective antennas are measured to obtain the angle and (3) a method, as described in the Japanese Patent Laid-Open No. 60-46477, in which two beams are formed with the oriented directions thereof being slightly shifted from each other in the vertical direction, the direction of the antenna axis at which these two beams intersect each other is set to be oriented to the middle point of the target and the image thereof, and the phase difference between the received waves (the composite wave of the direct wave and the indirect wave) associated with these two beams are measured, thereby the determining the height of the target with a low elevation angle.

However, in the methods of (1) and (2), in a case where the target with a low elevation angle exists over a relatively calm sea and the antenna beam includes the target and the image thereof generated by the surface of the sea, the interference between the direct wave from the target and the indirect wave(mirror reflection wave) passing the surface of the sea makes it impossible to correctly measure the angle. The third method involves disadvantages in that high accuracy is obtained only when reflection coefficient k of the surface of a sea is nearly equal to 1, and many ambiquities are obtained together with the true height of a target as the ratio of the antenna height to the wavelength increases.

To remove these problems, according to the present invention, there is provided a radar system having means wherein two beams are formed with the oriented directions thereof slightly shifted from each other in the vertical direction by use of an antenna, the direction of the antenna axis at which these two beams inersect each other is set to be oriented to the middle point of the target and the image thereof by use of a direction adjusting mechanism the phase differences between the received waves associated with these two beams are measured with respect to two frequencies, and the actual height of the target is determined from two sets of heights calculated based on the phase differences, each set including a plurality of heights, thereby measuring the height of the target with a low elevation angle (low elevation angle measurement).

In the present invention, the antenna axis is caused to aim at the mid point between a target and the image thereof. The resultant wave of a direct wave and an indirect wave is received through two beams, and then is processed through a predetermined procedure on the basis of the phase difference between these two beams. Therefore the radar system is still capable of eliminating influence of the indirect wave, for the reason which will be described later, even when the value of k is smaller than 1. Also, the aforementioned phase difference is measured with respect to two slightly different frequencies; and the true height of the target is determined by comparing two sets of series of data of target height calculated from these phase differences. Therefore the radar system is capable of eliminating ambiguity when the ratio of the antenna height to the wavelength is larger.

In addition, when the transmission is effected only with the upper beam of the two beams, there appears a difference between the transmission gains in the target direction and the image direction during the measurement of the angle of elevation, which leads to an advantage that the irradiation on the target (consequently, the interruption of the received signal) due to the null of the interference pattern is prevented. Moreover, the additional use of the monopulse angle measuring function leads to an advantage that the switch-over operation is available for the high angle of elevation. Furthermore, when the monopulse operation is conducted with the sum pattern for the transmission in the similar fashion as for the conventional method, there is provided an advantage that the transmission gain is improved and a vertically symmetrical curve is obtained for the angle error sensitivity curve.

In addition, the low elevation angle mode of the present invention can also be applied to an angle measurement of a high angle of elevation by use of the relationships between the received signal voltage ratio and the angle of elevation of the target due to two beams when the image does not exist in the beam. Moreover, as for the antenna (1), not only an antenna of the reflection mirror type but also an antenna of the pahsed array type may be adopted. Furthermore, two wavelengths $\lambda_1$ and $\lambda_2$ are used to remove the ambiguities; however, the ambiguities can also be removed by changing the height of the antenna in place of changing the wavelength. In addition, in an apparatus in which the monopulse angle measuring function is additionally included, the monopulse operation circuit may comprise both an elevation angle (EL) circuit and an azimuth (AZ) circuit.

BEST MODE FOR CARRYING OUT THE INVENTION

Figure 1:
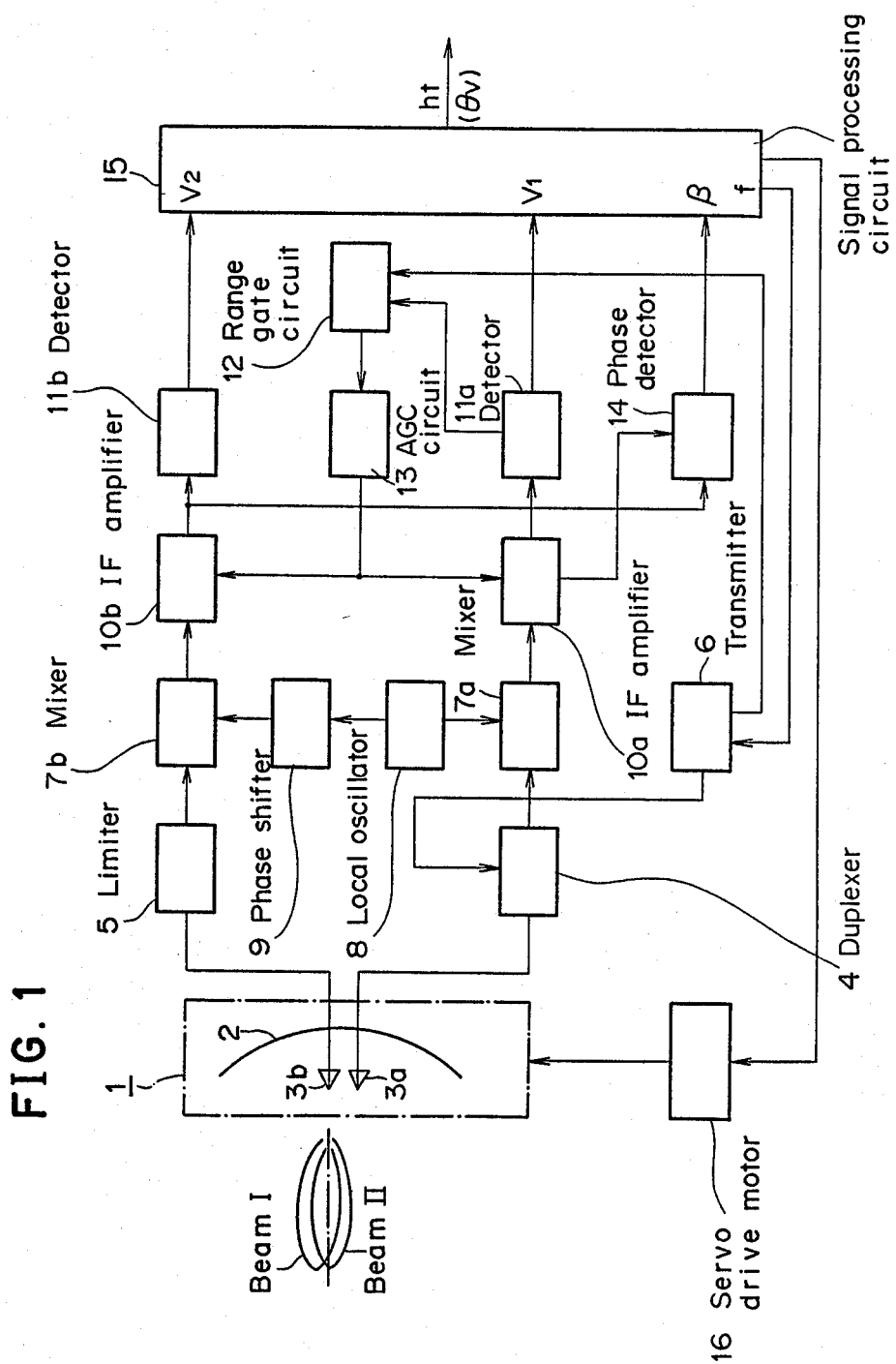
FIG. 1 is a block diagram showing an embodiment of the radar system according to the present invention.

FIG. 1 is a diagram illustrating an embodiment of the radar system according to the present invention. The system of this diagram comprises an antenna 1 including a parabolic reflection mirror 2 and two primary radiators 3a and 3b disposed at positions each equally apart from the focus of the parabolic reflection mirror 2 in the vertical direction for generating two pencil beams I and II having oriented directions each vertically, slightly, shifted with respect to the axis of the mirror, a duplexer 4, a limiter 5, a transmitter 6 with a variable frequency which is set by a frequency control signal from a terminal "f" of a signal processing circuit 15, mixers 7a and 7b, a local oscillator 8, a phase shifter 9, IF amplifiers 10a and 10b, detectors 11a and 11b, a range gate circuit 12 which follows the distance of the target to generate the gated video signal including the target signal an AGC circuit for automatically control the gains of the IF amplifiers 10a and 10b based on the output from the range gate circuit 12, a phase detector 14 for effecting a phase detection on the output signal from the IF amplifier 10b by use of the output signal from the IF amplifier 10a and for extracting the phase difference $\beta$ between both output signals, and a signal processing circuit 15 for generating a signal to automatically set the oriented direction of the antenna 1 from the received data and for achieving a calculation of the angle of elevation $\theta v$ of the target (i.e. the height ht) based on the phase difference $\beta$.

First, the RF power is supplied by use of a pulse transmission from the transmitter 6, passes the duplexer 4, and is radiated from the primary radiator 3a onto the parabolic reflection mirror 2. The radiated wave is shaped by the reflection mirror 2 to be a pencil beam (beam I) oriented to a direction slightly higher than the direction of the mirror axis and is radiated in a spatial zone in which the target exits.

Figure 2:
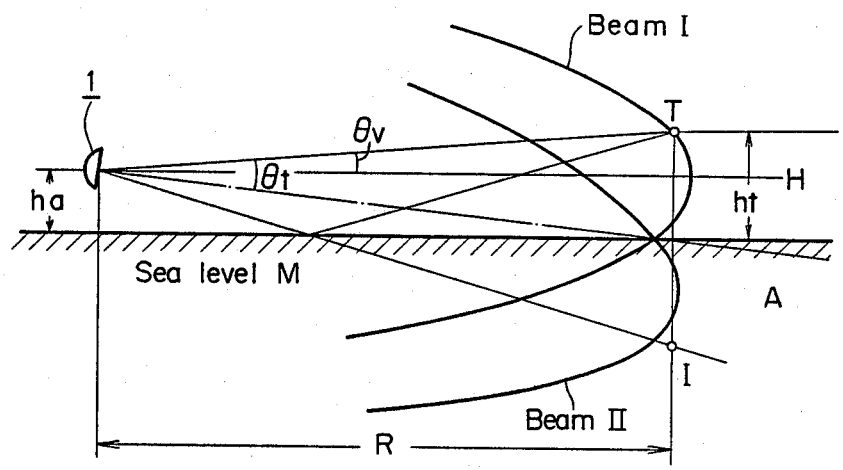
FIG. 2 is a relational diagram for the operation description showing relationships between the received wave and the beam between the antenna and target.

The RF pulse reflected on the target directs as shown in FIG. 2 partially as a direct wave and partically as an indirect wave to the antenna 1 and these waves are then separately combined by use of the beams I and II and are respectively received by the primary radiators 3a and 3b. The received wave received by the primary radiator 3a passes through received wave received by the primary radiator 3a passes through the duplexer 4, whereas the received wave received by the primary radiator 3b passes through the limiter 5. These signals reach the mixers 7a and 7b, respectively and are mixed with the output from the local oscillator 8. The obtained IF pulse outputs are respectively amplified by the IF amplifiers 10a and 10b. Here, the phase shifter 9 has been in advance adjusted so that the received waves obtained through the in-phase reception by use of the beams I and II (i.e. by the primary radiators 3a and 3b)

are output with the in-phase condition from the IF amplifiers 10a and 10b. A portion of the output from the detector 11a is sent via the range gate circuit 12 to the AGC circuit 13 so as to be used for the automatic gain control of the IF amplifiers 10a and 10b. Portions of the outputs from the IF amplifiers 10a and 10b are sent to the pahse detector 14 to extract the phase difference $\beta$ between the outputs. The outputs from the IF amplifiers 10a and 10b are respectively detected by the detectors 11a and 11b to obtain the video outputs $v_1$ and $v_2$. These outputs $\beta$, $V_1$, and $V_2$ are used as the input data to the signal processing circuit 15. Incidentally, the beams I and II are vertically deflected with the same angle from the direction of the mirror axis A as shown in FIG. 2. In FIG. 2, ha stands for the height of the antenna 1, R is a distance to the target, $\theta t$ indicates the deviation angle of the target from the mirror axis direction A, $\theta_v$ stands for an angle of elevation of the target, I is the image of the target T due to the surface of the sea, M indicates the reflection point, and H denotes the direction of the horizon. consequently, the video pulse voltages $v_1$ and $v_2$ obtained from the received waves associated with the beams I and II are voltages which are in proportion to the amplitudes $V_1$ and $V_2$ of the composite wave obtained by combining the received wave (direct wave) from the target and the received wave (indirect wave) from the image as shown in FIG. 3.

Figure 3:
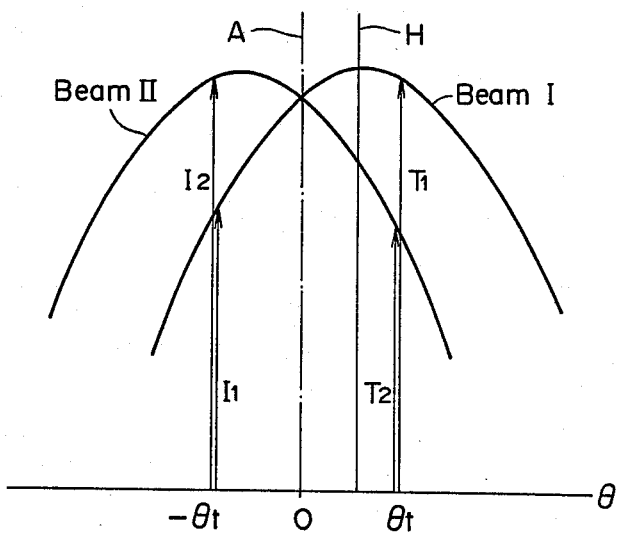
FIG. 3 is a relational diagram illustrating relationships between the received waves from the target and the image and the angle of elevation.

In FIG. 3, $T_1$ and $T_2$ are recieved waves from the target respectively due to the beams I and II, $I_1$ and $I_2$ stand for the received waves from the images respectively associated with the beams I and II, and the abscissa $\theta$ indicates the angle of elevation.

Figure 4:
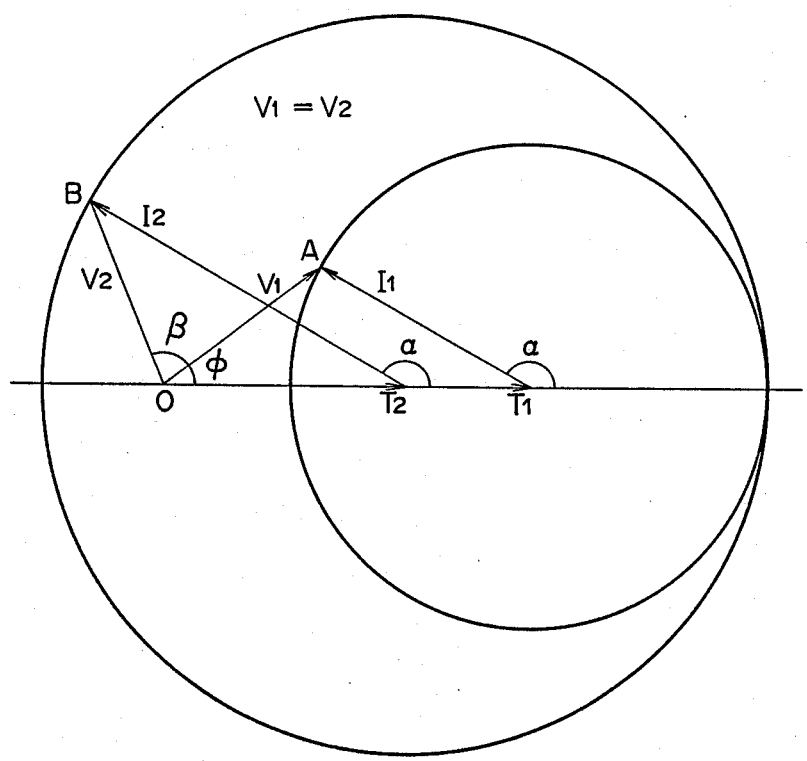
FIG. 4 is a diagram showing relationships between the RF output and the image reception waves.

Considering now a case where the mirror axis direction of the antenna 1 is oriented to the center of the target T and the image I on assumption that the reflection coefficient k of the surface of the sea is 1, the composite waves of the direct wave and the indirect wave become to be identical to each other for the beams I and II and hence $V_2/V_1=1$ results. This leads to the relationships of FIG. 4. In FIG. 4, $\alpha$ retains the following relationships with the phase $\alpha'$ of the indirect wave with respect to the direct wave. Namely, assuming a change in the phase angle at the reflection point M to be $\Psi$, $$\alpha' \simeq \Psi + \frac{4\pi h a h t}{R\lambda} = \alpha + 2l\pi \quad (1)$$

is obtained, where l is 0 or a positive integer selected to satisfy $-\pi \leq \alpha \leq \pi$.

From FIG. 4, assuming the angle between $V_1$ and $T_1$ ($T_2$) to be $\phi$, the following relational expressions are obtained by use of condition, $V_2/V_1=1$.

$$\beta + 2\phi = \alpha \quad (2)$$

and $$\frac{T_2}{T_1} = \frac{\sin \phi}{\sin(\beta + \phi)} \quad (3)$$

where, $$\beta = \tan^{-1}\{\sin\alpha/(T_2/T_1 + \cos\alpha)\} - \tan^{-1}\{\sin\alpha/(T_1/T_2 + \cos\alpha)\}$$

In addition, for $\beta \geq 0$, $\pi \geq 2\beta \geq 0$ resuts; whereas for $\beta < 0$, $-\pi \leq \alpha < \beta < 0$ results; whereas for $\beta < 0$, $-\pi \leq \alpha < \beta < 0$ results.

Figure 5:
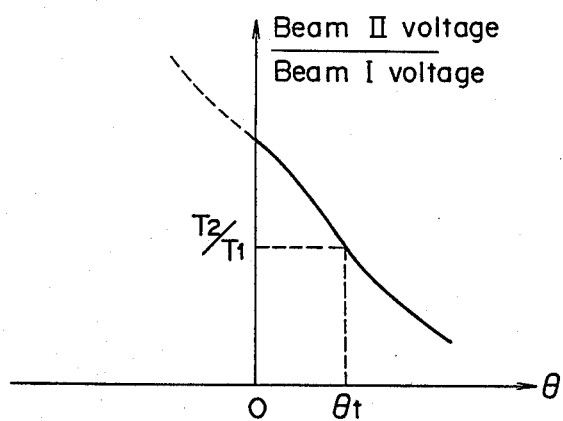
FIG. 5 is a relational diagram illustrating relationships between the angle of elevation of the target and the ratio of the received signal voltages

Moreover, when the received signal voltage due to the beam II is normalized by use of the received signal voltage due to the beam I from a single target, there is obtained on output curve in which the output monotonously decreases as the target elevation angle $\theta$ increases as shown in FIG. 5.

Representing here this curve as $$y = f(\theta) \quad (4)$$

$\theta = \theta t$ is uniquely attained for $y = T_2/T_1$.

In addition, from FIG. 2, ht is expressed as follows.

$$ht = ha + R \tan\theta v = ha + R \tan(\theta t - \gamma) \quad (5)$$

In the expressions (1) to (5), $\lambda$, ha, and $f(\theta)$ are known as the radar parameters, and $\Psi \simeq \pi$. Moreover, $\beta$ and R can be obtained by measurement. In the expression (1) set ht to a small value and substitute the value of $\alpha$ obtained from this condition for the expression (2). Obtain the value of $\phi$ from the expression (2) and substitute the obtained value for the expression (3), then $T_2/T_1$ is attained. Obtain $\theta t$ satisfying $y = T_2/T_1$ from the expression (4) and substitute the resultant value for the expression (5), then the calculated value of ht is attained. Next, slightly increase the setting value of ht and calculate ht again, then the calculated value of ht different from the value previously obtained is attained. Through repetitiously conducting the operation above, a point where the setting value matches with the calculated value, namely the objective ht value is attained.

In actual, these values match with each other for a plurality of values of ht generated with a substantially equal consequently, to prevent the ambiguity, two transmission frequencies $\lambda_1$ and $\lambda_2$ satisfying the following relationship are used.

$$\lambda_2 = \frac{m}{m-1} \lambda_1 \quad (6)$$

Here, if the maximum measurement height is expressed as ht max, m satisfies $$\frac{ht\ max}{R} \lesssim \frac{m\lambda_1}{2ha} = \frac{(m-1)\lambda_2}{2ha} \quad (7)$$

This indicates that the setting value and the calculated value of ht match at m points for $\lambda_1$ and at $m-1$ points for $\lambda_2$ in the range of $0 < ht \leq ht\ max$.

Two ht progressions in which the numbers of terms obtained for $\lambda_1$ and $\lambda_2$ are m and $m-1$ contain items including the actual ht, and the values of the terms of the progressions match with each other only for the terms; consequently, it is easy to select the terms. Specifically, a series of data of the height ht consisting of m terms, is obtained on the basis of $\beta_1$ with respect to the transmitted frequency $\lambda_1$, and then another series of data of the height ht consisting of $m-1$ terms, is obtained on the basis of $\beta_2$ with respect to the transmitted frequency $\lambda_2$.

The corresponding terms of these two series of data are compared to extract two terms closest to the other. Either of the closest two terms extracted may be used as the true height. For higher accuracy, several tens of pulses may be transmitted successively on a same frequency to obtain an average value of the $\beta$. For such measurement, the transmitter frequency is switched by a control signal from a terminal "f" of the signal processing circuit 15 from one value to another every several tens of pulses. Switching of the frequency may be effected electronically as in conventional agile radars. The target elevation angle $\theta v$ can be attained from the expression (5) by use of the actual ht thus obtained. On the other hand, there exist two methods to direct the mirror axis direction A of the antenna 1 to the center of the target T and the image I. In one of these methods, from the height ha of the radar antenna and the measured distance R to the target, $\gamma = \tan^{-1} ha/R$ is obtained and the mirror axis direction A is oriented to a direction lower than the horizontal direction H by $\gamma$. According to this method, since the mirror axis direction A is not influenced from the reflection coefficient k of the surface of the sea, for the $\beta$ to be measured, there exists a cancellation effect as shown in the following expression between the first term and the second term on the right side thereof, and hence $\beta$ does not greatly depend on k; consequently, the measurement of the elevation angle of the target becomes also possible for $k < 1$.

$$\beta = \tan^{-1} \frac{K \sin\alpha}{T_1/T_2 + k \cos\alpha} - \tan^{-1} \frac{k \sin\alpha}{T_1/T_2 + k \cos\alpha} \quad (8)$$

Moreover, in the other method, $(v_1 - v_2/(v_1 + v_2)$ is calculated by the signal processing circuit 15, and the antenna 1 is driven by the servo drive motor 16 to minimize this value, thereby setting the oriented direction of the mirror axis direction A. In this case, since the value of the $(v_1 - v_2)/(v_1 + v_2)$ can take the minimum value depending on the value of $\alpha$ even if the mirror axis direction A is not oriented to the center of the target T and the image I, the measurement is conducted again with another wavelength having a slight difference to avoid such a case.

According to this method, since the mirror axis direction A as the reference of the measurement of the elevation angle of the target is influenced by the k, the case where a high precision is attained is limited to a case where k is in the neighborhood of 1; however, the operation becomes to be possible in a case of a long distance target for which the center direction of the target T and the image I can no longer be represented by the $\gamma$. However, a correction associated with the curved surface of the earth is necessary.

Figure 6:
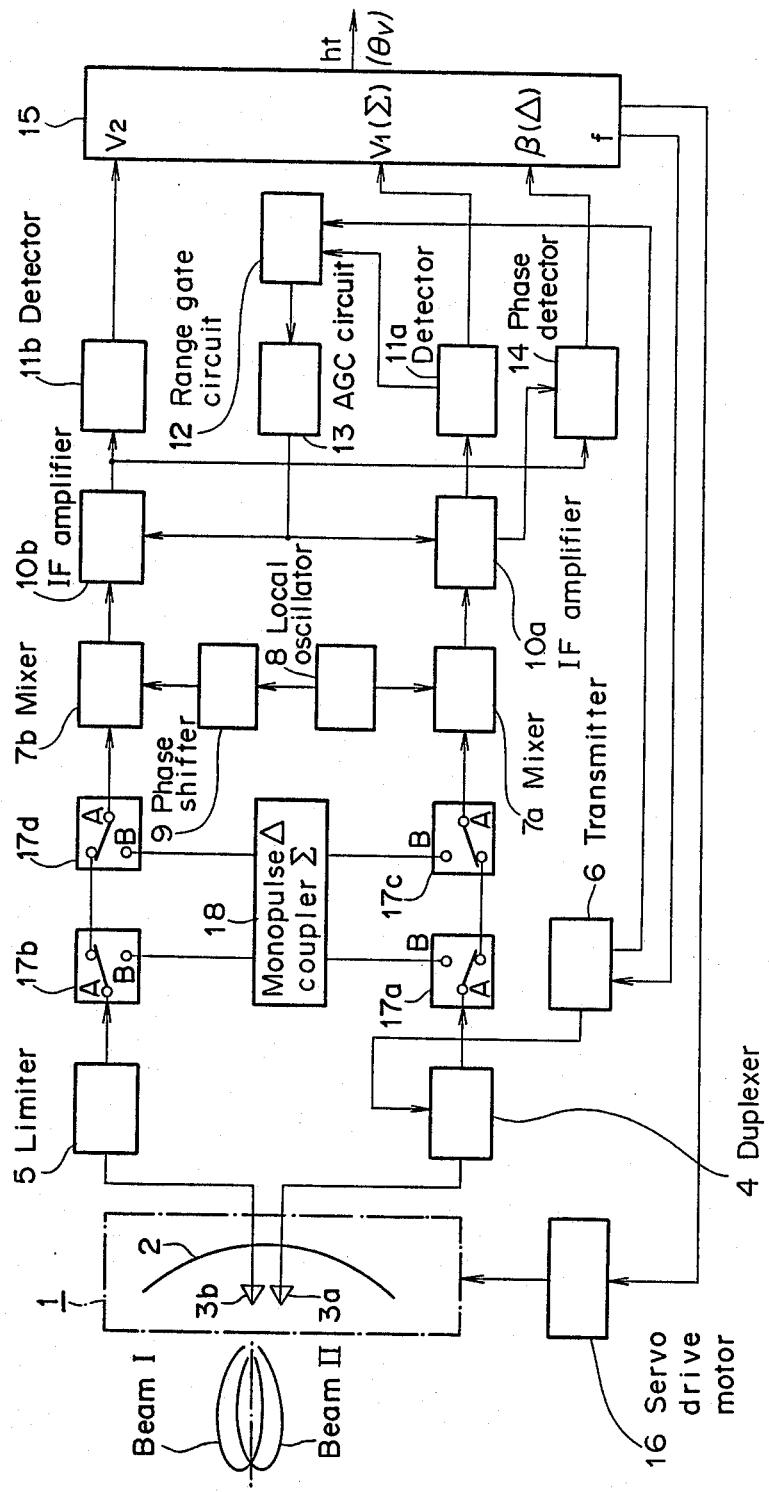
FIG. 6 is a block diagram showing another embodiment of the present invention.

FIG. 6 shows another embodiment of the present invention. In this diagram, reference numerals 1–16 are equivalent to those with the same reference numerals of FIG. 1. Among the items of the parts added to FIG. 6, 17a and 17b indicate low-power switches and 18 denotes a monopulse coupler to attain the sum ($\Sigma$) and the difference ($\Delta$) with respect to the RF reception electric fields obtained from the low-power switches 17a and 17b.

First, the RF power is supplied by use of a pulse transmission from the transmitter 6, passes the duplexer 4, and is radiated from the primary radiator 3a onto the parabolic reflection mirror 2. the radiate wave is shaped by the reflection mirror 2 to be a pencil beam (beam I) to a direction slightly higher than the direction of the mirror axis and is radiated in a spatial zone in which the target exists. Thereafter, the processing of the obtained RF reception pulse is executed in the completely same manner as that described above in a case where the circuit is connected to the terminal A of the low-power switches 17a to 17d (in the case of the low elevation angle mode), and from the measurement of $\beta$ (or, in addition, $v_1$ and $v_2$), ht and hence $\theta v$ can be obtained.

In a case where the circuit is connected to the terminal B of the low-power switches 17a to 17d (the case of the monopulse mode), the RF reception pulse is converted into $\epsilon$ and $\Delta$ signals in the monopulse coupler 18, signal is fed to ($\epsilon$) of a signal processing circuit 15 through a terminal B of the low-power switch 17c. signal is output through a terminal B of the switch 17d and then is phase-detected with the $\Delta$ signal at a phase detector 14 to produce an elevation angle error signal. Then the elevation angle error signal is fed to ($\Delta$) of the signal processing circuit 15. These two signals fed to the circuit 15, are directly utilized in conventional monopulse radar operation. Namely, according to the embodiment shown in FIG. 6, the angle measuring method to measure a low angle of elevation of the target in which the beam covers both the target and the image and the ordinary monopulse angle measuring method can be included.

Figure 7:
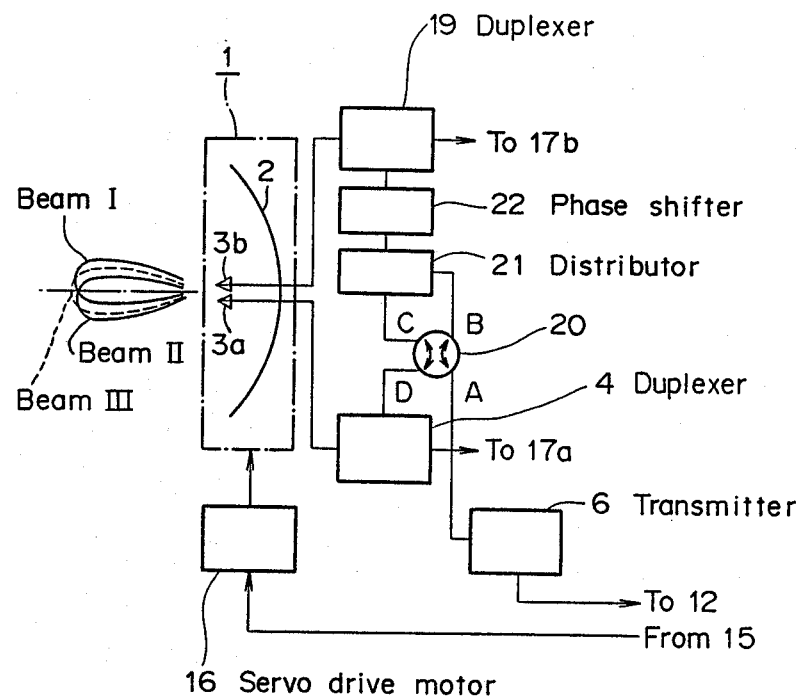
FIG. 7 is a block diagram illustrating further another embodiment of the present invention.

FIG. 7 shows another embodiment of the present invention. In this diagram, the omitted portion is the same as the portion following the components 17a and 17b of FIG. 6. In the portion added to FIG. 7, reference numeral 19 indicates a unit which is the same as a duplexer 4 of the figure and is used in place of the limiter 5 of FIG. 6, reference numeral 20 stands for a high-power switch to which a circuit is connected in the direction of the arrowed mark, reference numeral 21 designates a distributor to equally distribute the input RF power in the in-phase condition, and reference numeral 22 is a phase shifter for equalizing the electric length from the distributor 21 to the two duplexers 4 and 19.

First, in the monopulse mode, the high-power switch 20 connects the circuit as shown in the diagram. The RF pulse power sent from the transmitter 6 passes via the terminals A and B of the high-power switch 20 and reaches the distributor 21, which equally distributes the power in the in-phase condition. The resultant signals respectively passes through the duplexers 4 and 19 and are radiated from the primary radiators 3a and 3b onto the paraboic reflection mirror 2. The radiated waves are combined in the space and are shaped by the reflection mirror to be a pencil beam (beam III) oriented to the mirror axis direction, and then the resultant wave is radiated into the spatial zone in which the target exists. Thereafter, the processing of the RF reception pulse obtained is the same as that of the case in the monopulse mode of the embodiment of FIG. 6.

This enables to increase the transmission gain in the neighborhood of the mirror axis where the target exists as compared with the case of FIG. 6.

Next, in the low elevation angle mode, the high-power switch 20 connects the circuit in the direction rotated by 90° from the state illustrated in the diagram. In this case, the RF pulse power sent from the transitter 6 passes through the terminals A and D of the high-power switch 20 and is radiated from the primary radiator 3a onto the parabolic reflection mirror 2. The reflection mirror 2 shapes the wave to be a pencil beam (beam I) oriented to a direction slightly above the direction of the mirror axis and the beam I is radiated into the spatial zone in which the target exists. Thereafter, the processing of the RF reception pulse obtained is the same as the case of the low elevation angle of the embodiment shown in FIG. 6.

Industrial Applicability

The present invention is applicable to a radar system for precisely measuring the position of a target with a low angle of elevation over the surface of a sea.

I claim:

1. A radar system for measuring the height of a target with a low elevation angle, comprising
    a transmitter for outputting measuring-pulse of two different frequencies ($\lambda_1$, $\lambda_2$), one frequency at a time;
    an antenna for receiving a first beam (I) and a second beam (II), one beam having a slightly different elevation angle from the other, and for emitting said measuring-pulses from said transmitter through at least one of said beams;
    an antenna direction adjusting mechanism for determining a direction in which a receiving sensitivity of said first beam is equal to a receiving sensitivity of said second beam, the direction determined on the basis of the height (ha) of said antenna and the distance (R) to the target;
    phase difference detecting means for determining, with respect to said two frequencies respectively, a phase difference ($\beta$) between a received signal through said first beam and a received signal through said second beam;
    height data calculating means for calculating, with respect to said two frequencies, respectively, a series of data indicative of the height (ht) of the target on the basis of said phase difference ($\beta$); and
    height determining means for extracting corresponding nearly equal data from the respective series of data indicative of the height (ht) by comparing the two series of data obtained with said two frequencies ($\lambda_1$, $\lambda_2$).

2. A radar system for measuring the height of a target with a low elevation angle, comprising
    a transmitter for outputting measuring-pulses of two different frequencies ($\lambda_1$, $\lambda_2$), one frequency at a time;
    an antenna for receiving a first beam (I) and a second beam (II), one beam having a slightly different elevation angle from the other, said antenna emitting said measuring-pulses from said transmitter through at least one of said beams;
    an antenna direction adjusting mechanism for causing a direction in which a receiving sensitivity of said first beam is equal to a receiving sensitivity of said second beam, said direction determined on the basis of a height (ha) of said antenna (1) and a distance (R) to the target;
    a monopulse coupler for producing a sum signal and difference signal between a received signal through said first beam and a received signal through said second beam;
    switch means for establishing a low elevation angle measurement mode by outputting directly said received signals respectively, and for establishing a monopulse measurement mode by outputting respective sum and difference signals from said monopulse coupler;
    phase difference detecting means connected with said switch means and for determining, with respect to said two frequencies respectively, a phase difference ($\beta$) between a received signal through said first beam and a received signal through said second beam;

height data calculating means for calculating, with respect to said two frequencies, respectively, a series of data indicative of the height (ht) of the target (T) on the basis of said phase difference ($\beta$); and height determining means for extracting corresponding nearly equal data from the respective series of data indicative of the height (ht) by comparing the two series of data obtained with said two frequencies ($\lambda_1, \lambda_2$);

said switch means being operated for selecting said low elevation angle measurement mode and said monopulse measurement mode.

* * * * *